(12) United States Patent
Hung

(10) Patent No.: US 12,055,811 B2
(45) Date of Patent: Aug. 6, 2024

(54) ELECTRONIC DEVICE HAVING LIGHT SHIELDING ELEMENT

(71) Applicant: Innolux Corporation, Miao-Li County (TW)

(72) Inventor: Luca Hung, Tainan (TW)

(73) Assignee: Innolux Corporation, Miao-Li County (TW)

( * ) Notice: Subject to any disclaimer, the term of this patent is extended or adjusted under 35 U.S.C. 154(b) by 0 days.

(21) Appl. No.: 18/070,376

(22) Filed: Nov. 28, 2022

(65) Prior Publication Data

US 2023/0107085 A1 Apr. 6, 2023

Related U.S. Application Data

(62) Division of application No. 16/905,969, filed on Jun. 19, 2020, now abandoned.

(51) Int. Cl.
*G02F 1/1335* (2006.01)
*G02F 1/1333* (2006.01)
*G02F 1/1345* (2006.01)

(52) U.S. Cl.
CPC .. *G02F 1/133512* (2013.01); *G02F 1/133388* (2021.01); *G02F 1/13452* (2013.01); *G02F 1/13456* (2021.01); *G02F 1/13458* (2013.01); *G02F 2202/28* (2013.01)

(58) Field of Classification Search
CPC .......... G02F 1/13452; G02F 1/133512
See application file for complete search history.

(56) References Cited

U.S. PATENT DOCUMENTS

| | | | | |
|---|---|---|---|---|
| 4,643,526 A | * | 2/1987 | Watanabe | G02F 1/13452 349/151 |
| 2001/0010569 A1 | * | 8/2001 | Jin | G02F 1/133308 349/122 |
| 2013/0293804 A1 | * | 11/2013 | Kim | G02F 1/133308 349/58 |
| 2019/0049771 A1 | * | 2/2019 | Ye | H01L 27/12 |
| 2019/0171060 A1 | * | 6/2019 | Chen | G02F 1/133512 |

FOREIGN PATENT DOCUMENTS

| | | |
|---|---|---|
| CN | 102566091 A | 7/2012 |
| CN | 210401950 U | 4/2020 |

OTHER PUBLICATIONS

Chinese Office Action Application No. 202010565270.2 dated Jan. 28, 2023.

* cited by examiner

*Primary Examiner* — Lauren Nguyen
(74) *Attorney, Agent, or Firm* — Patterson + Sheridan, LLP

(57) ABSTRACT

An electronic device is provided, including a panel, a circuit board, and a light shielding element. The panel includes a side surface, and the side surface has a first region and a second region. The circuit board is attached to the first region of the side surface, and includes a top surface. The shielding element is attached to the second region of the side surface and the top surface of the circuit board.

18 Claims, 4 Drawing Sheets

ELECTRONIC DEVICE HAVING LIGHT SHIELDING ELEMENT

CROSS REFERENCE TO RELATED APPLICATIONS

This application is a Divisional of application Ser. No. 16/905,969, filed Jun. 19, 2020, the entirety of which is incorporated by reference herein.

BACKGROUND OF THE DISCLOSURE

Field of the Disclosure

The application relates in general to an electronic device, and in particular, to an electronic device having a panel.

Description of the Related Art

The current trend of electronic devices having a display panel (for example, in tablet computers or smartphones) is moving towards large screens and narrow bezels. However, due to the narrow bezels in an electronic device, such an electronic device may experience light leakage at its edge. Therefore, how to address the aforementioned problem has become an important issue.

BRIEF SUMMARY OF DISCLOSURE

To address the deficiencies of conventional products, an embodiment of the disclosure provides an electronic device, including a panel, a circuit board, and a light shielding element. The panel includes a side surface, and the side surface has a first region and a second region. The circuit board is attached to the first region of the side surface, and includes a top surface. The shielding element is attached to the second region of the side surface and the top surface of the circuit board.

BRIEF DESCRIPTION OF DRAWINGS

The disclosure can be more fully understood by reading the subsequent detailed description and examples with references made to the accompanying drawings.

DETAILED DESCRIPTION OF DISCLOSURE

The making and using of the embodiments of the electronic device are discussed in detail below. It should be appreciated, however, that the embodiments provide many applicable inventive concepts that can be embodied in a wide variety of specific contexts. The specific embodiments discussed are merely illustrative of specific ways to make and use the embodiments, and do not limit the scope of the disclosure.

Unless defined otherwise, all technical and scientific terms used herein have the same meaning as commonly understood by one of ordinary skill in the art to which this disclosure belongs. It should be appreciated that each term, which is defined in a commonly used dictionary, should be interpreted as having a meaning conforming to the relative skills and the background or the context of the present disclosure, and should not be interpreted in an idealized or overly formal manner unless defined otherwise.

Figure 1:
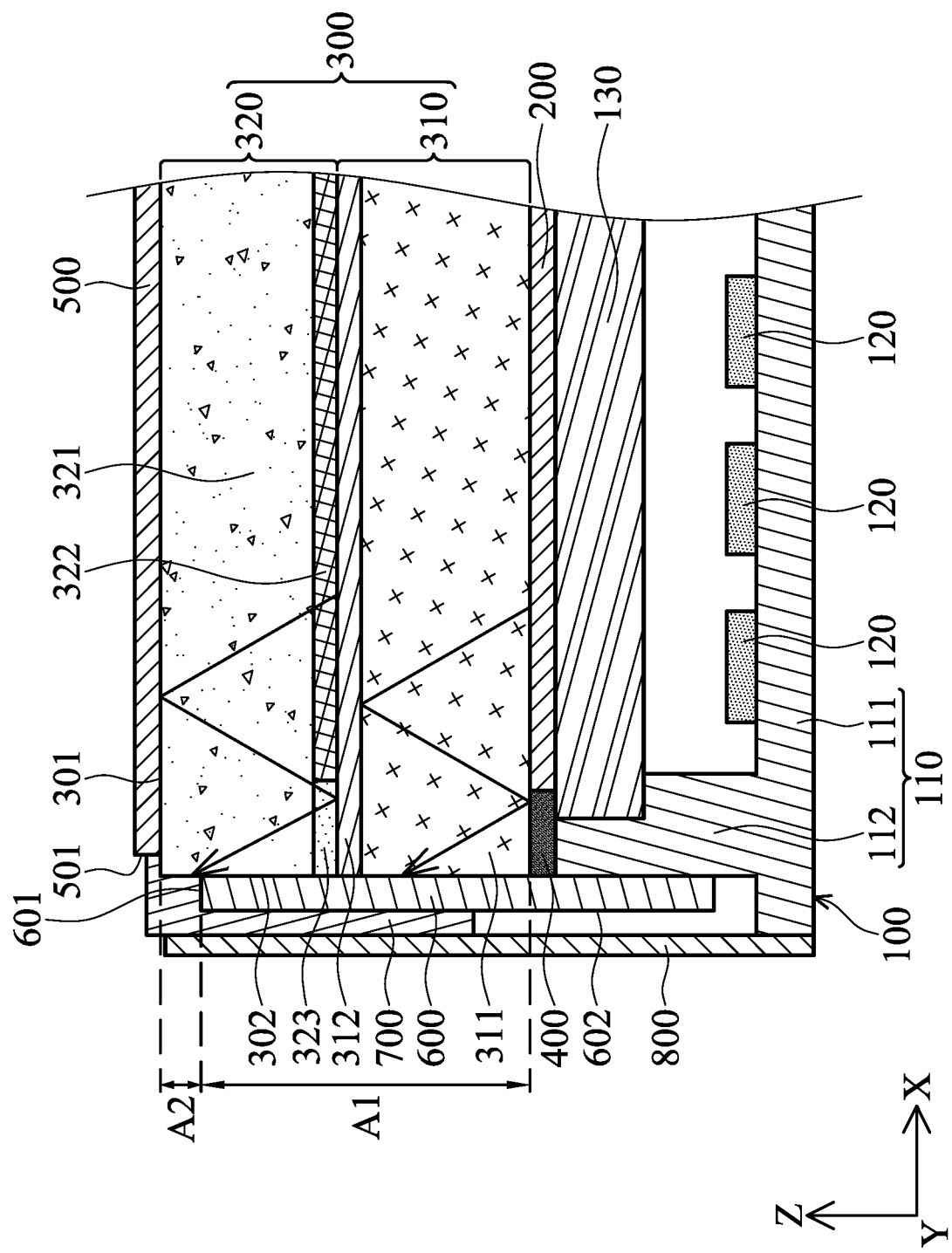
FIG. 1 is a schematic diagram of an electronic device according to an embodiment of the disclosure.

Referring to FIG. 1, in an embodiment of the disclosure, an electronic device E primarily includes a backlight module 100, a bottom polarizer 200, a panel 300, an engaging element 400, a top polarizer 500, a circuit board 600, a light shielding element 700, and a covering element 800. The backlight module 100 can provide light into the panel 300, and the panel 300 can control the amount of the output light, and the electronic device E can display different image. For example, the electronic device E can include thin film transistor liquid-crystal display (TFT-LCD), and can be applied to the public information display (PID), the television, the monitor, the notebook PC, the smartphone, or the smart watch, but it is not limited thereto.

As shown in FIG. 1, the backlight module 100 is direct-type backlight, and can include a frame 110, at least one light emitting member 120, and an optical film 130, but it is not limited thereto. The frame 110 includes a bottom plate 111 and a lateral wall 112 connected to each other. The light emitting member 120 is disposed on the bottom plate 111, and the lateral wall 112 surrounds the light emitting member 120. The optical film 130 is disposed on the lateral wall 112, and a distance is formed between the optical film 130 and the light emitting member 120. The optical film 130 can include one or more optical films, such as a brightness enhancement film, a prism film, a diffuser film, or a diffuser plate, but it is not limited thereto. The light emitting member 120 can include a light-emitting diode (LED), a light tube (such as cold cathode fluorescent lamp, CCFL), or other suitable light source. The light emitting member 120 emits light toward the optical film 130, and the light passes through the optical film 130 and enters the panel 300. The light-emitting diode can be an organic light-emitting diode (OLED), a mini LED, a micro LED, a quantum dot light-emitting diode (QLED or QD-LED), but it is not limited thereto. It should be noted that the backlight module in the disclosure can be side-light type backlight, too. One of the difference between the direct-type backlight module and the side-light type backlight module is that the side-light type backlight module further includes a light guide plate, and the light emitting member 120 is disposed adjacent to at least one side surface of the light guide plate.

As shown in FIG. 1, the panel 300 is affixed to the backlight module 100 via the engaging element 400, and the bottom polarizer 200 is disposed between the panel 300 and the backlight module 100. The engaging element 400 can be an adhesive glue, but it is not limited thereto. The light from the light emitting member 120 can enter the panel 300 after passing through the optical film 130 and/or the bottom polarizer 200.

The panel 300 includes a wire assembly 310 and a filter assembly 320. The wire assembly 310 is disposed between the filter assembly 320 and the backlight module 100, and includes a substrate 311 and a wire layer 312. The substrate 311 can be a glass substrate, a sapphire substrate, or a substrate made of suitable materials. The wire layer 312 is arranged on a surface of the substrate 311 facing the filter assembly 320, and can include wires made of metal (such as aluminum, copper, or the alloy thereof) and/or transparent conductive material (such as indium tin oxide). The filter assembly 320 includes a glass substrate 321, a color filter layer 322, and a light shielding layer 323, wherein the color filter layer 322 and the light shielding layer 323 are disposed on a surface of the glass substrate 321 facing the wire assembly 310. In this embodiment, the light shielding layer 323 is a black matrix layer having a grid structure, and the color filter layer 322 is surrounded by the light shielding layer 323. In particular, the color filter layer 322 can include a plurality of small filters corresponding to multiple colors (not shown), and the positions of the different small filters are corresponded to the different grids in the black matrix layer.

The top polarizer 500 is also disposed on the glass substrate 321 of the filter assembly 320. The difference is that the surface disposing the top polarizer 500 is opposite to the surface disposing the color filter layer 322 and the light shielding layer 323. In other words, as shown in FIG. 1, the top polarizer 500 is disposed on the upper surface 301 of the panel 300.

The circuit board 600 is attached to the side surface 302 of the panel 300, and electrically connected to the wire layer 312 of the panel 300. The side surface 302 is connected to the upper surface 301, and can be divided into a first region A1 and a second region A2. In detail, on the side surface 302 of the panel 300, the portion which overlaps the circuit board 600 in the normal direction of the side surface 302 (such as the X-axis in FIG. 1) is divided into the first region A1, and the portion which does not overlap the circuit board 600 in the normal direction is divided into the second region A2. Since the second region A2 is not covered by the circuit board 600, and a gap is formed between the top polarizer 500 and the connection point of the upper surface 301 and the side surface 302, some light entering the panel 300 will leave the electronic device E from the second region A2 or the aforementioned gap after multiple reflection, and the light leakage occurs at the edge of the electronic device E.

For improving the aforementioned condition, the light shielding element 700 is attached to the top surface 601 of the circuit board 600 and the second region A2 of the side surface 302 of the panel 300, and extended to the top polarizer 500 (in detail, the light shielding element 700 is attached to the lateral surface 501 of the top polarizer 500), and the second region A2 and the gap between the edge of panel 300 and the top polarizer 500 can be covered. Therefore, the light leaving the electronic device E from the aforementioned position can be reduced.

In this embodiment, the circuit board 600 is not totally opaque, and the light shielding element 700 can be extended and attached to the outer surface 602 of the circuit board 600. The outer surface 602 of the circuit board 600 is a surface away from the panel 300. It should be noted that, since the light shielding element 700 is extended and attached to the outer surface 602 of the circuit board 600, the contact area between the light shielding element 700 and the circuit board 600 is increased, and the light shielding element 700 can be affixed more steadily. It should be noted that, in some embodiments of the disclosure, the circuit board 600 can be a flexible printed circuit (FPC) used in a chip-on-film (COP) structure, but it is not limited thereto. In some embodiments, the circuit board 600 is a printed circuit board (PCB) having epoxy and being harder, or a combination of a flexible printed circuit board with a printed circuit board.

In this embodiment, the light shielding element 700 includes a light-curing adhesive or a heat-curing adhesive, such as an acrylic ultraviolet curing adhesive (UV glue), but it is not limited thereto.

Referring to FIG. 1, the covering element 800 is connected to the frame 110 of the backlight module 100, and surrounds the panel 300 and the backlight module 100. Since the transmittance of the covering element 800 is low, the leakage of the light from the region of the circuit board 600 adjacent to the backlight module 100 is reduced. Thus, the light shielding element 700 is not necessary to extend to the region of the circuit board 600 adjacent to the backlight module 100. In other words, in this embodiment, a portion of the outer surface of the circuit board 600 is exposed from the light shielding element 700.

Furthermore, in order to reduce the non-active region at the edge of the electronic device E to achieve narrow-bezel, the covering element 800 may not extend above the top polarizer 500. That is, in the normal direction of the top polarizer 500 (the Z-axis), the top polarizer 500 and the covering element 800 are separated and not overlapped.

In this embodiment, the covering element 800 includes the flexible soft material (such as mylar or light shielding tape) or a harder material (such as metal or plastic), but it is not limited thereto.

Figure 2:
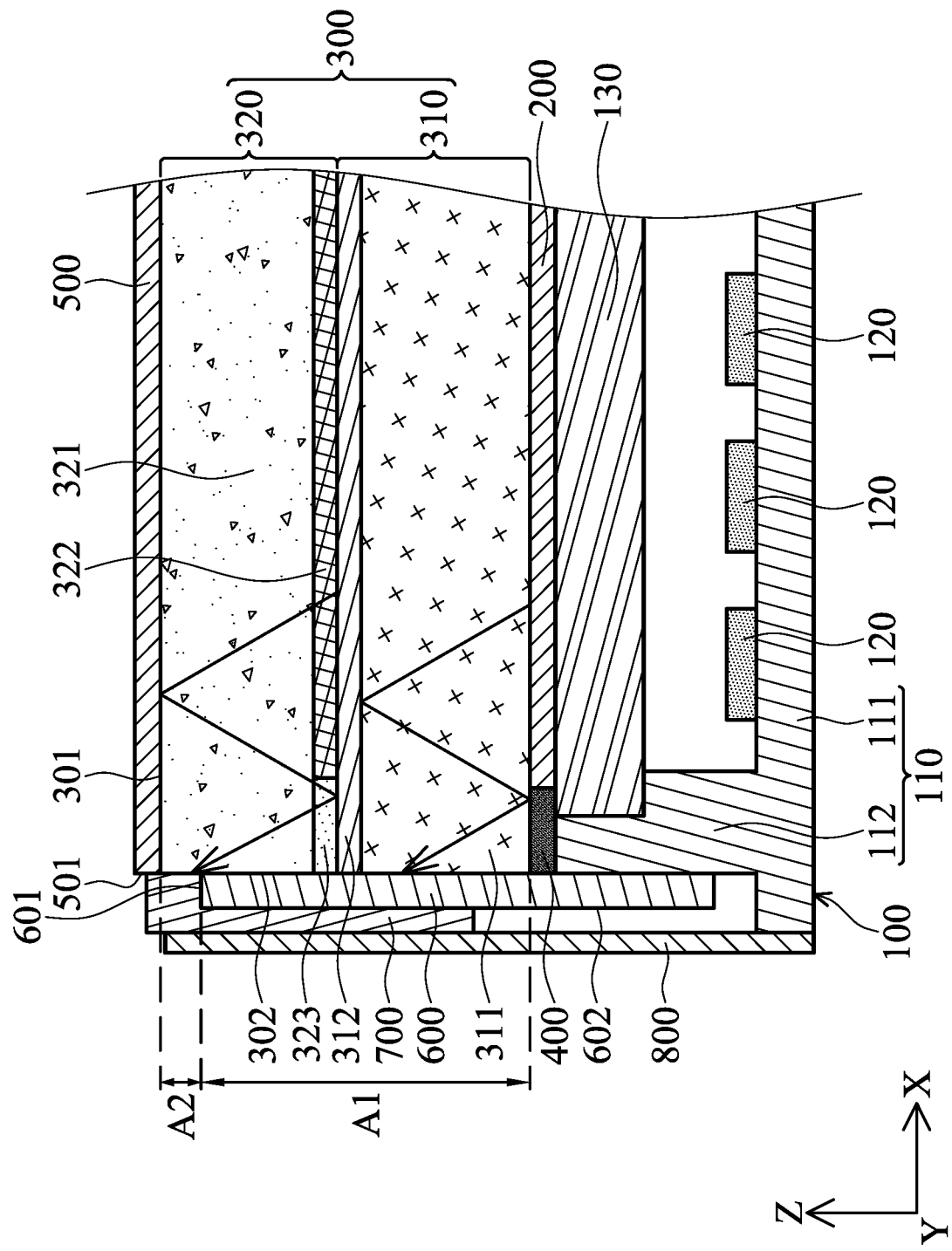
FIG. 2 is a schematic diagram of an electronic device according to another embodiment of the disclosure.

Referring to FIG. 2, in another embodiment of the disclosure, the top polarizer 500 has larger dimensions, and its lateral surface 501 is substantially aligned with the side surface 302 of the panel 300. In this embodiment, the light shielding element 700 is not extended to the upper surface 301 of the panel 300. The light shielding element 700 is directly affixed to the lateral surface 501 of the top polarizer 500, the second region A2 of the side surface 302 of the panel 300, and the top surface 601 and the outer surface 602 of the circuit board 600.

It should be noted that, in the Z-axis, the light shielding element 700 protrudes from the upper surface 301 of the panel 300, so as to reduce the leakage of the light from the corner of the panel 300.

Figure 3:
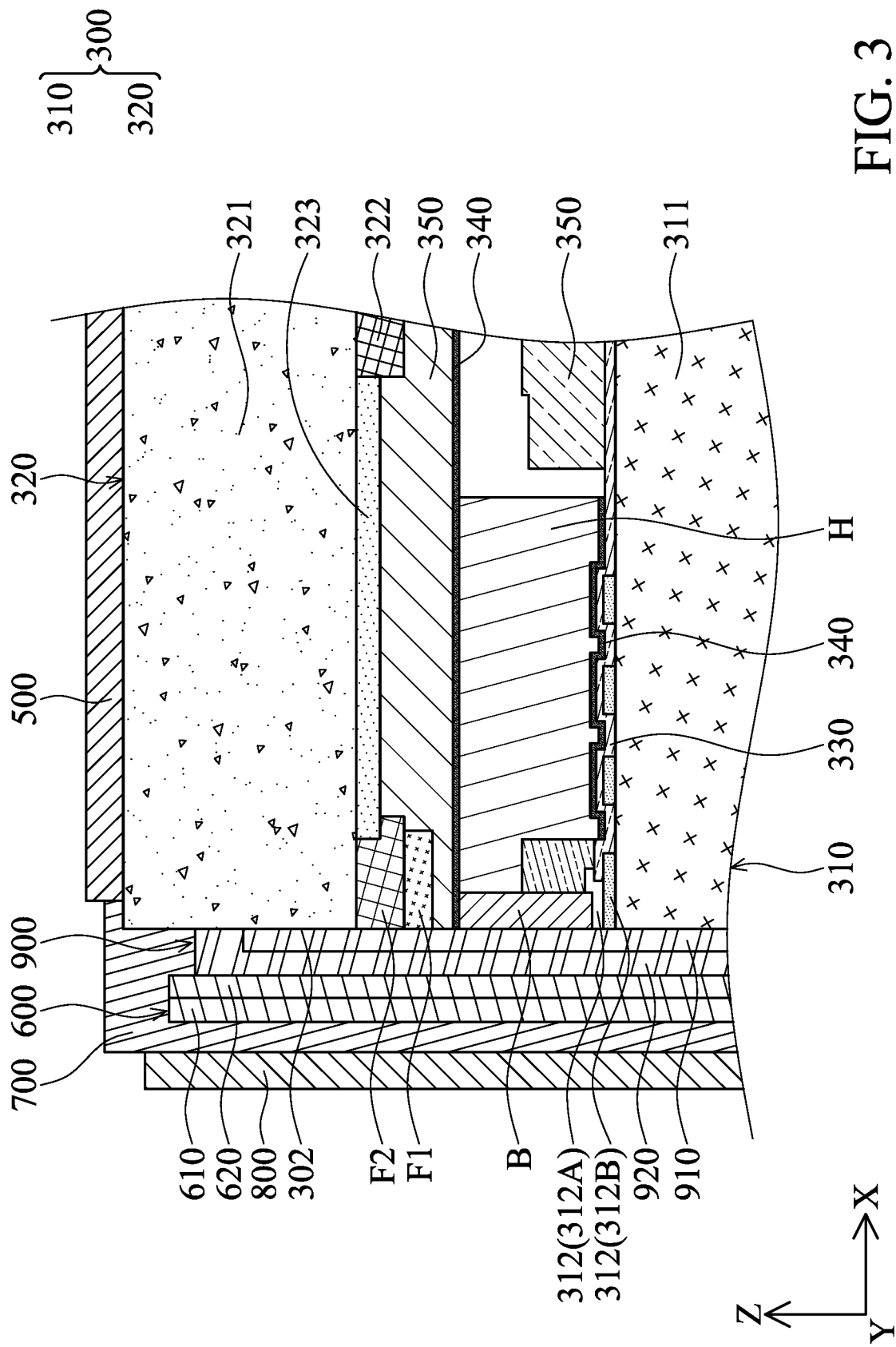
FIG. 3 is a schematic diagram of a panel connected to a circuit board according to some embodiments of the disclosure.
Figure 4:
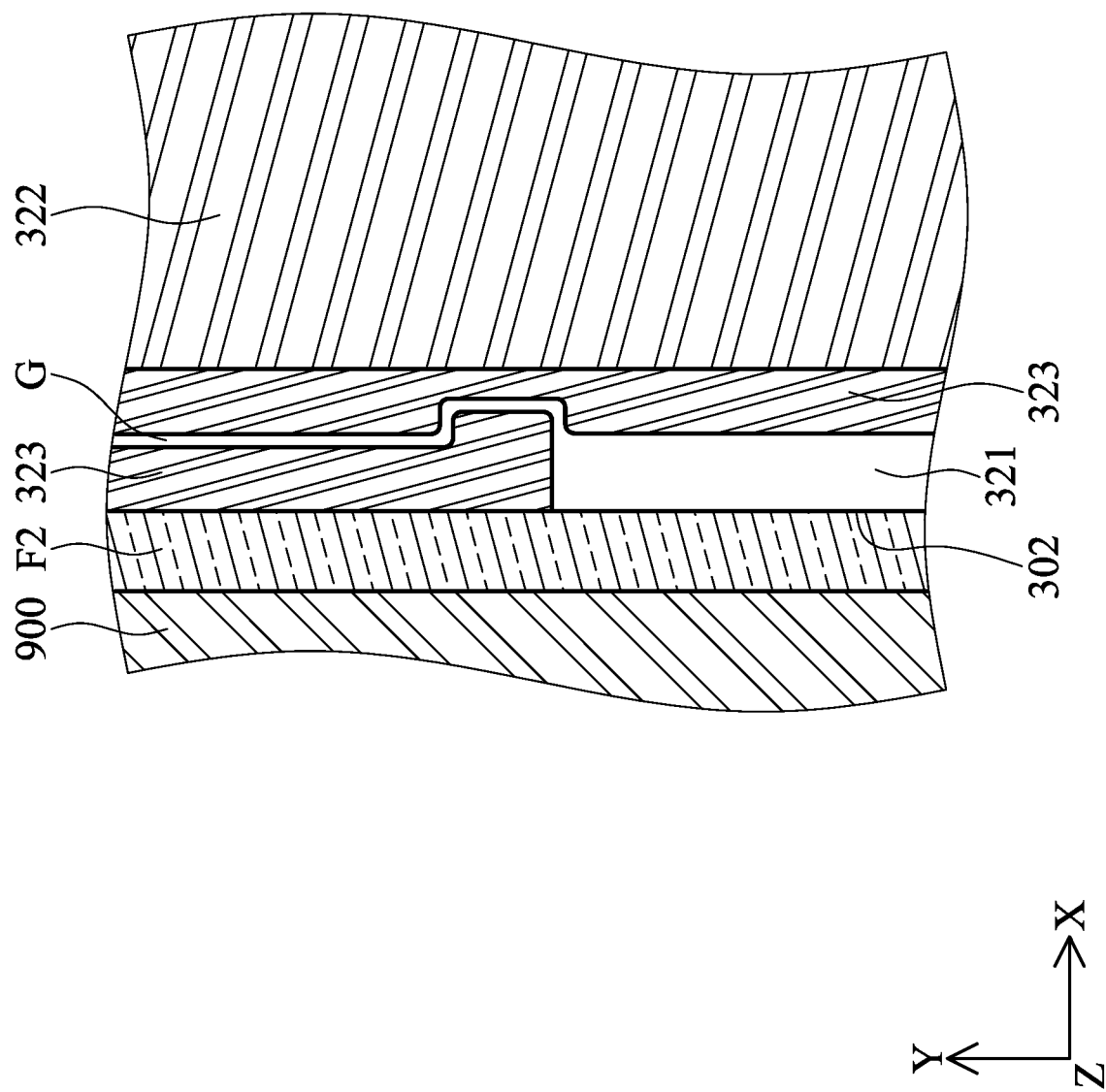
FIG. 4 is a schematic diagram of a shielding element according to some embodiments of the disclosure.

FIG. 3 is a detail schematic diagram of the connection between the panel 300 and the circuit board 600 according to some embodiments, and FIG. 4 is a schematic diagram of the light shielding layer according to some embodiments. As shown in FIG. 3, the circuit board 600 has a main body 610 and a pin 620. The circuit board 600 is electrically connected to the wire layer 312 via a conductive element 900, so as to electrically connect the circuit board 600 to the panel 300. For example, the conductive element 900 includes a conductive glue 910, an anisotropic conductive film (ACF) 920, other suitable materials or a combination of the aforementioned materials.

At the position adjacent to the conductive element 900, the wire layer 312 can include one conductive layer or a stack of more conductive layers (such as the conductive layers 312A and 312B shown in FIG. 3). Moreover, the panel 300 can further include a insulation layer 330, a PI layer (polyimide layer) 340, and a planarization layer 350, but it is not limited thereto. The insulation layer 330 can be disposed between the PI layer 340 and the conductive layer 312B, but it is not limited thereto.

The filter assembly 320 of the panel 300 is affixed to the wire assembly 310 via the adhesive element H, wherein the adhesive element H can include a sealant of the panel 300, but it is not limited thereto. A blocking element B can be disposed between the adhesive element and the circuit board 600, so as to reduce the adhesive element H from flowing out from the side surface 302 of the panel 300. For example, the blocking element B can be a photo spacer, but it is not limited thereto. In some embodiments, the blocking element B can be omitted.

As shown in FIG. 4, the light shielding layer 323 in the panel 300 is spaced by a distance from the side surface 302 of the panel 300, or a slot G extending along the Y-axis can be formed, and the introduction of the moisture by the light shielding layer 323 into the electronic device E can be reduced. The light might pass the gap between the light shielding layer 323 and the side surface 302 or the slot G. Thus, in order to further reduce the light leakage at the edge of the electronic device E, in some embodiments, one or more filter layers can be disposed between the light shielding layer 323 and the circuit board 600, as shown in FIG. 3.

For example, as shown in FIG. 3, a first filter layer F1 and a second filter layer F2 can be disposed between the light shielding layer 323 and the circuit board 600, wherein the first filter layer F1 and the second filter layer F2 are arranged along the Z-axis direction, and the first filter layer F1 is disposed between the second filter layer F2 and the wire assembly 310. Owing to the disposition of the first filter layer F1 and the second filter layer F2, most of the light can be filtered when passing through the gap between the light shielding layer 323 and the circuit board 600, and the light leakage at the edge of the electronic device E can be reduced. In some embodiments, the first filter layer F1 includes a blue filter, and the second filter layer F2 includes a red filter. The combination of the aforementioned filter layers is merely an example, and the number, the color, and the order of the filter layers are not limited in the disclosure.

On the side surface 302 of the panel 300, one or more circuit boards 600 can be disposed. When the electronic device E includes a plurality of circuit boards 600, these circuit boards 600 can be disposed at intervals, and one or more sheet elements can be disposed between the circuit boards 600. Thus, the lateral side of the electronic device E where the circuit boards 600 are disposed can become more flat.

The features between the aforementioned embodiments can be used or combined as long as they do not violate the spirit or conflict.

In summary, an electronic device is provided, including a panel, a circuit board, and a light shielding element. The panel includes a side surface, and the side surface has a first region and a second region. The circuit board is attached to the first region of the side surface, and includes a top surface. The shielding element is attached to the second region of the side surface and the top surface of the circuit board.

Although some embodiments of the present disclosure and their advantages have been described in detail, it should be understood that various changes, substitutions and alterations can be made herein without departing from the spirit and scope of the disclosure as defined by the appended claims. For example, it will be readily understood by those skilled in the art that many of the features, functions, processes, and materials described herein may be varied while remaining within the scope of the present disclosure. Moreover, the scope of the present application is not intended to be limited to the particular embodiments of the process, machine, manufacture, compositions of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps. Moreover, the scope of the appended claims should be accorded the broadest interpretation so as to encompass all such modifications and similar arrangements.

While the disclosure has been described by way of example and in terms of preferred embodiment, it should be understood that the disclosure is not limited thereto. On the contrary, it is intended to cover various modifications and similar arrangements (as would be apparent to those skilled in the art). Therefore, the scope of the appended claims should be accorded the broadest interpretation to encompass all such modifications and similar arrangements.

What is claimed is:

1. An electronic device, comprising:
a panel, comprising an upper surface and a side surface which is perpendicular to the upper surface of the panel, wherein the side surface has a first region and a second region;
a circuit board, attached to the first region of the side surface, and the circuit board comprising a top surface and an outer surface which is perpendicular to the top surface of the circuit board; and
a light shielding element, attached to the second region of the side surface, the top surface of the circuit board, and the outer surface of the circuit board,
wherein a portion of the outer surface of the circuit board is exposed from the light shielding element,
wherein the panel comprises a first substrate and a second substrate disposed opposite to the first substrate, the first substrate has a first sub side surface, the second substrate has a second sub side surface, the first sub side surface and the second subside surface are substantially aligned with each other, the first region corresponds to the first sub side surface and a portion of the second sub side surface, and the second region corresponds to another portion of the second sub side surface.

2. The electronic device as claimed in claim 1, wherein the light shielding element is attached to the upper surface of the panel.

3. The electronic device as claimed in claim 1, comprising a top polarizer disposed on the panel, wherein the light shielding element is attached to the top polarizer.

4. The electronic device as claimed in claim 1, wherein the first region is connected to the upper surface.

5. The electronic device as claimed in claim 1, comprising a top polarizer disposed on the panel, wherein the top polarizer comprises a lateral surface aligned with the side surface of the panel.

6. The electronic device as claimed in claim 5, wherein the top polarizer is disposed on the upper surface of the panel, and the light shielding element protrudes from the upper surface of the panel.

7. The electronic device as claimed in claim 1, further comprising a covering element, wherein the covering element surrounds the panel, and the light shielding element is disposed between the panel and the covering element.

8. The electronic device as claimed in claim 7, comprising a top polarizer disposed on the panel, wherein the top polarizer and the covering element are separated from each other in a normal direction of the top polarizer.

9. The electronic device as claimed in claim 1, further comprising a conductive element, wherein the panel comprises a wire layer, and the circuit board is electrically connected to the wire layer via the conductive element.

10. The electronic device as claimed in claim 9, wherein the wire layer comprises a plurality of conductive layers.

11. The electronic device as claimed in claim 9, wherein the conductive element comprises a conductive glue and an anisotropic conductive film.

12. The electronic device as claimed in claim 1, wherein the panel comprises:
- a wire assembly;
- a filter assembly;
- an adhesive element, disposed between the wire assembly and the filter assembly, and attached to the wire assembly and the filter assembly; and
- a blocking element, disposed between the wire assembly and the filter assembly, and disposed between the adhesive element and the circuit board.

13. The electronic device as claimed in claim 1, wherein the panel comprises a light shielding layer and a first filter layer, and the first filter layer is disposed between the light shielding layer and the circuit board.

14. The electronic device as claimed in claim 13, wherein the panel further comprises a wire assembly and a second filter layer, the second filter layer is disposed between the light shielding layer and the circuit board, and the first filter layer is disposed between the second filter layer and the wire assembly.

15. The electronic device as claimed in claim 1, further comprising a plurality of circuit boards and at least one sheet element disposed between the circuit boards.

16. The electronic device as claimed in claim 1, comprising a backlight module and an engaging element, wherein the engaging element is disposed between the backlight module and the panel, and the panel is affixed to the backlight module through the engaging element.

17. The electronic device as claimed in claim 16, comprising a bottom polarizer disposed between the backlight module and the panel.

18. The electronic device as claimed in claim 1, wherein the light shielding element comprises a light-curing adhesive or a heat-curing adhesive.

* * * * *